HEADSET FEATURING COLLAPSIBILITY FOR STORAGE

Filed Dec. 19, 1967 2 Sheets-Sheet 1

INVENTORS
J. RICHARD DYAR
WILLIAM McNEES
BY D. Kendall Cooper
ATTORNEY

HEADSET FEATURING COLLAPSIBILITY FOR STORAGE

Filed Dec. 19, 1967 2 Sheets-Sheet 2

United States Patent Office 3,532,837
Patented Oct. 6, 1970

3,532,837
HEADSET FEATURING COLLAPSIBILITY FOR STORAGE

John Richard Dyar and William McNees, Lexington, Ky., assignors to International Business Machines Corporation, Armonk, N.Y., a corporation of New York Filed Dec. 19, 1967, Ser. No. 691,840
Int. Cl. H04m *1/05*
U.S. Cl. 179—156 7 Claims

ABSTRACT OF THE DISCLOSURE

The invention concerns a headset, such as those used by transcribers for listening to dictated material from a record media, and particularly concerns a headset having a hub portion for accommodating an audio receiver and a pair of extending sound-conducting tubes, each having an ear piece. The head set structure enables the collapsing of the tubes in close proximity for storage in an associated transcribing unit, for example, as well as expanded rotation about the hub portion for positioning at a considerably greater distance for use by the transcriber. The headset has means for detenting the sound tubes in the collapsed condition and in the expanded condition.

CROSS REFERENCES TO RELATED PATENT APPLICATIONS

The following patent applications are of interest:

U.S. patent application Ser. No. 9677, entitled "Transcriber or the Like," filed Dec. 7, 1967, now U.S. Pat. D212,422, with Eliot F. Noyes, as inventor and assigned to the same assignee as the present application.

U.S. patent application Ser. No. 12,984, entitled "Headset or the Like," now U.S. Pat. D215,217, with Eliot F. Noyes as inventor, filed concurrently herewith, and assigned to the same assignee as the present application.

Other reference

The following reference is of interest:

IBM Technical Disclosure Bulletin, May 1967, pages 1776 and 1777, authored by W. F. Wing, entitled "Retractable Cord Take-Up Reel With Auto-Reset Cord Stop."

BRIEF BACKGROUND OF THE INVENTION

Field and prior art

The field of the invention includes audio headsets, and more particularly headsets of the type having sound-conducting tubes extending from a hub portion that accommodates a sound receiver. Examples of prior headsets of this nature include (1) an audio headset having two non-flexible metal tubes extending from a hub portion with a cavity into which a magnetic diaphragm type receiver is incorporated. The tubes can be rotated about the center of the receiver to adjust the size, but rotation is in one direction only. The tubes are retained in place by a friction arrangement. Another example, (2) is an audio headset with a detachable magnetic diaphragm type receiver opening into a hollow, flexible, plastic U-shaped tube. The tube has a natural spring action which helps to keep it in place for use under the chin of the wearer. The receiver fits into one end of the tube and to balance the sound pressure level at the output of each ear, a plastic diaphragm is placed between the receiver neck and the ear piece on the side on which the receiver is mounted.

Summary

According to the present invention, an audio headset is provided with a pair of tube elements, each having an earpiece and extending from a central hub portion for conducting sound to the ears of the user supplied by a receiver mounted in the central hub portion. Each tube is designed with a gently curving mid-portion and an extremity formed substantially at right angles to the mid-portion for supporting earpieces that are thereby positioned in the proper direction for insertion in the ears of the user. Means is provided in the hub portion of the headset in the form of ball detent assemblies for each tube that enables rotation of the tubes essentially about their respective axes to a collapsed condition in close proximity for easier storage in an associated transcriber unit, or rotation to an opposed condition opposite one another in preparation for use. The hub portion of the headset comprises mating complementary sections that are pivotally assembled in order that the tubes may be moved further from one another thereby permitting adjustment of the tubes to suit the user. The detenting means in an exemplary embodiment permits collapsing of the tubes into close proximity in substantially parallel planes, each plane extending from the hub portion in a first predetermined direction to insure compactness and ease of storage, and further establishes, by a simple rotary motion, detenting of the tubes opposite one another and essentially in a second common plane selected for convenience approximately at a right angle and in a second predetermined direction with respect to the first predetermined direction.

The invention further contemplates a headset structure with but a single sound tube wherein the rotary movements with respect to the hub portion are also provided to orient the tube in a preferred more compact relationship with respect to the hub portion, or to expand it for use.

Additionally, much smaller tubing is used for the tube elements in the headset and superior sound is obtained by "loading" the receiver with an appropriately sized cavity that acts both as an acoustic load for the receiver and as impedance transformer between the receiver neck portion and the tubes. In this manner, the "tube" or "hollow"sound that is characteristic of prior headsets is minimized.

Objects

Accordingly, an object of the present invention is to provide a headset that is collapsible for storage and expandable for use.

Another object of the invention is to provide a headset featuring movement of the sound tubes into close proximity for storage and further movement to opposed positions in preparation for use.

Another object of the invention is to provide a headset that features movement between collapsed and expanded conditions through manual manipulation by the user.

A further object of the invention is to provide a headset with portions positionable essentially in a first compact planar arrangement for ease of storage and to a second planar condition for use.

A still further object of the invention is to provide a headset with sound-conducting elements movable between a first planar condition and a second planar condition and having detenting means for retaining such elements in at least said two conditions, as selected.

The foregoing and other objects, features, and advantages of the invention will be apparent from the following more particular description of the preferred embodiment of the invention as illustrated in the accompanying drawings.

DETAILED DESCRIPTION

Figure 1:
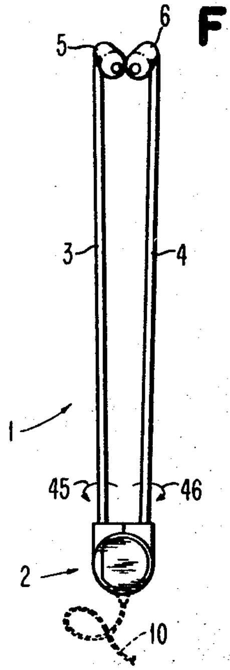
FIG. 1 is a front view of a headset according to the present invention having a central hub portion and a pair of sound tubes and, with the sound tubes in a collapsed condition ready for storage.
Figure 3:
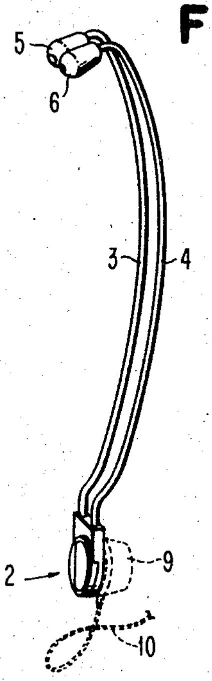
FIG. 3 is a perspective view of the headset of FIG. 1.
Figure 4:
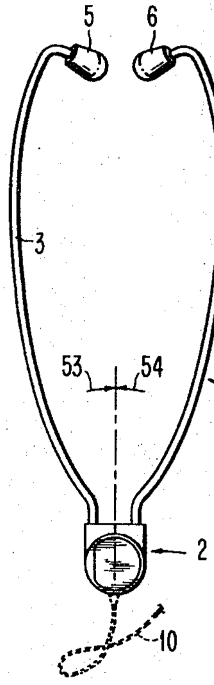
FIG. 4 is a front view of the headset of FIG. 1 with the sound tubes rotated at right angles in preparation for use.
Figure 5:
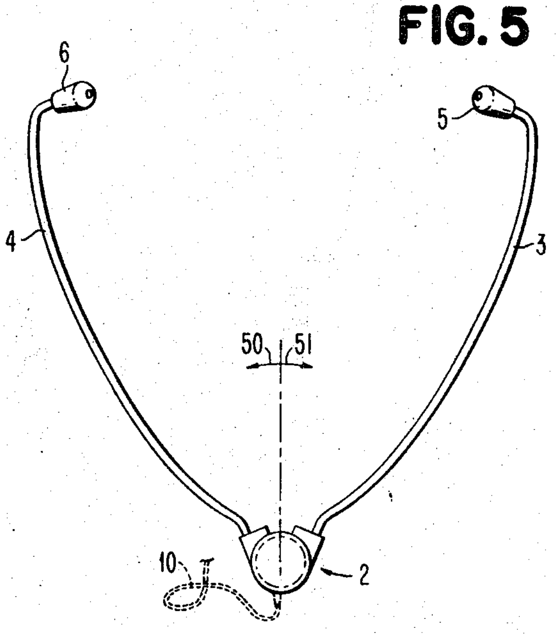
FIG. 5 is a rear elevation of the headset of FIGS. 1–4 showing the sound tubes rotated in a common plane and with the ear pieces ready for insertion in the ears of the user.
Figure 6:
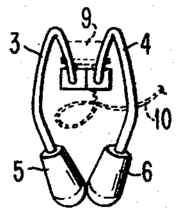
FIG. 6 is a top view of the headset of FIGS. 1–5 showing the headset in a collapsed condition in preparation for insertion in a storage compartment of an associated transcribing unit.
Figure 14:
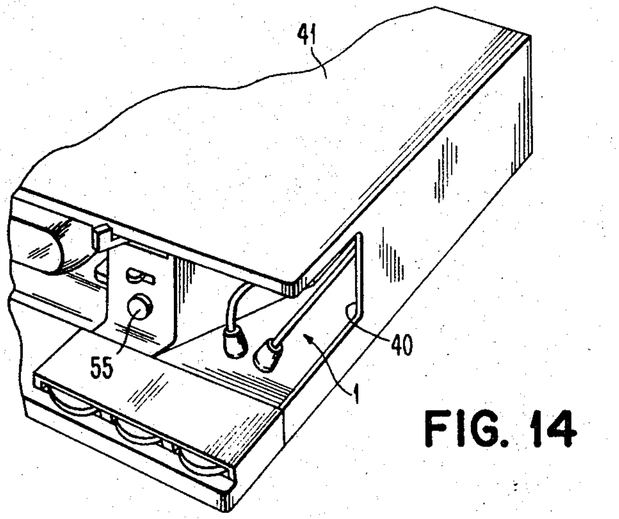
FIG. 14 illustrates a portion of a transcribing apparatus having a compartment for storage of the headset according to the present invention, when not in use.

As indicated, the headset according to the present invention features movements between a first compact collapsed condition illustrated particularly in FIGS. 1, 3, and 6 for ease of storage in a transcriber, such as the transcribing apparatus of FIG. 14, and further movement to an expanded condition in readiness for use as shown particularly in FIGS. 4 and 5. Referring to FIG. 1, headset 1 comprises a central hub portion 2 and includes sound tubes 3 and 4 having attached earpieces 5 and 6. It should be noted that the view of FIG. 5 is from an opposite direction to the views of FIGS. 1 and 4. FIGS. 1 and 4 represent the headset as observed by the user while FIG. 5 represents the headset as seen by an observer looking at the user. The headset has an associated sound receiver 9 with associated cable 10 for conducting signals, such as audio signals to the receiver 9.

Hub portion 2 of the headset 1 and various associated structural components including a detenting means is shown particularly in FIGS. 7–13*b*. The hub portion comprises a pivot hub 12 having a portion **12*a* adapted for the mounting of the various elements shown in FIG. 7 and including a spring washer 14, a right pivot housing 16, baffles 17 and 18, and a left pivot housing 20. Hub 12 has a groove 12*b* that accommodates a C-clip 21** to retain all of the elements in operating condition.

Figure 13A:
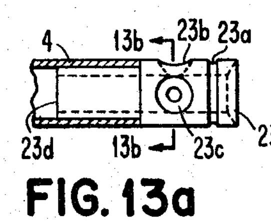
FIG. 13*a* represents a detent tube fitting for use in the hub portion of FIG. 7
Figure 13B:
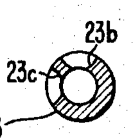
FIG. 13*b* is a sectional view of the fitting on the line **13*b*—13*b*** in FIG. 13*a*.

Pivot housing 16 has a generally rectangular portion **16*a* for accommodating sound tube 4 and a fitting 23** associated therewith as shown particularly in FIGS. 13*a* and 13*b*. Pivot housing 20 has a generally rectangular portion **20*a* to accommodate sound tube 3 and a comparable associated fitting 25. Both fittings 23 and 25 have grooved portions, such as portion 23*a* of fitting 23** in FIG. 13*a* arranged to accommodate a retaining pin such as pin 26 for fitting 23 and pin 27 for fitting 25.

Associated with each of the sound tubes 3 and 4 and fittings 23 and 25 are detenting means for retaining the tubes in a first predetermined plane, collapsed and ready for storage, or a second predetermined plane, extended and ready for use.

Figure 7:
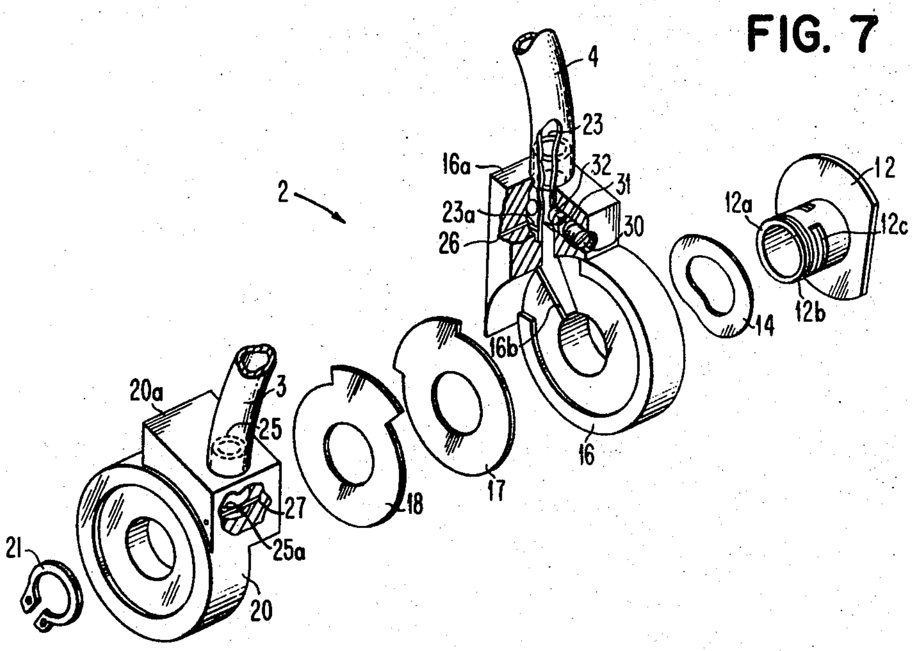
FIG. 7 is an exploded view of various elements comprising the central hub portion of the headset of FIGS. 1–6 showing the internal structures and particularly the means for detenting the sound tubes in first and second planes.
Figures 8, 9, 10, 11:
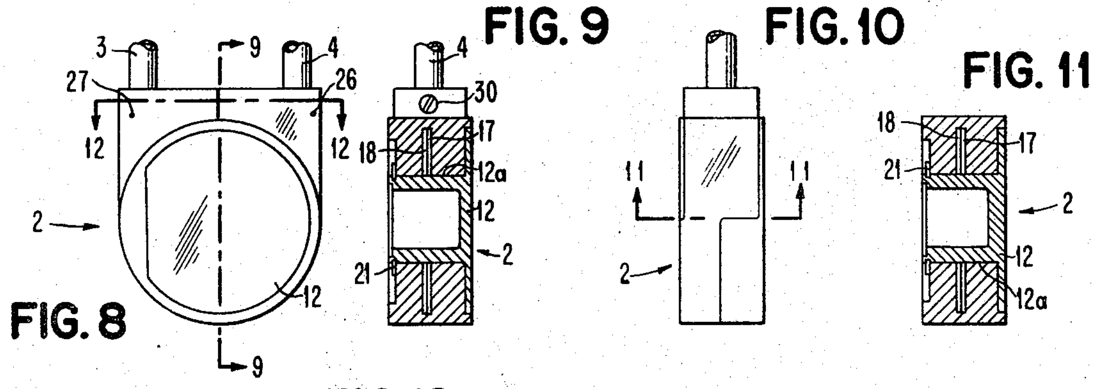
FIG. 8 is a front elevation of the hub portion of the headset.
FIG. 9 is a sectional view of the hub portion on the line 9—9 in FIG. 8.
FIG. 10 is a side elevation of the hub portion of the headset.
FIG. 11 is a sectional view of the hub portion of the headset taken on the line 11—11 in FIG. 10.

As shown for tube 4 and fitting 23, FIG. 7, the detenting means comprises a screw 30, compression spring 31 and ball bearing detent element 32. These are accommodated in the rectangular portion **16*a* of pivot housing 16 and extend in such a manner that the ball element 32 is pressed against fitting 23 with the various elements assembled. The degree of pressure is adjusted by screw 30. Tube 3 and fitting 25** have a similar detenting means, shown most clearly in FIGS. 12*a* and 12*b* and including similar elements: screw 35, compression spring 36, and ball bearing detent element 37 all arranged with ball element 37 normally pressing against fitting 25, when assembled. Each of the fittings 23 and 25 is provided with machined depressions positioned essentially at right angles on their peripheries for cooperation with the ball elements 32 and 37, respectively. The machined detenting depressions in fitting 23 are shown most clearly in FIGS. 13*a* and 13*b* and designated **23*b* and 23*c*. The fittings 23 and 25 are preferably made of a hardened material, such as stainless steel, and each has a neck portion such as portion 23*d* of fitting 23 extending within the hollow tube 4** that is normally of a softer material, such as aluminum, for reducing the overall weight of the headset.

Figure 2:
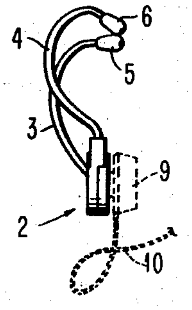
FIG. 2 is a bottom perspective view of the headset of FIG. 1 as it may appear when laying on its side.

FIG. 2 illustrates tubes 3 and 4 positioned 180° opposite to their positions in FIGS. 1, 3, and 6 with respect to hub portion 2. No detent position is shown for this condition in FIGS. 12*a* and 12*b*, but such a position can be provided if desired. That is, as many more detent positions may be provided, in addition to the two positions shown, as circumstances may require. It may be desirable to have only one detent position at a preferred location. Also, the detent mechanism is illustrative only and may take many forms, such as a ball, wedge, or face cam, with or without spring loading depending on the characteristics of the materials selected. Sufficiently elastic materials may serve as detents. The use of harder materials for tubes 3 and 4 at least in the detenting portions would eliminate the need for fittings 23 and 25.

OPERATION AND USE

Normally, when not in use, headset 1 is positioned in a storage compartment of an associated transcriber unit, such as storage compartment 40 in unit 41, FIG. 14. The transcriber unit may be of the type disclosed in the previously noted patent entitled "Transcriber or the Like." While located in storage compartment 40, headset 1 is conditioned to its collapsed state, particularly illustrated in FIGS. 1, 3, and 6. In a typical case, the headset is moved rearwardly into the storage compartment 40 and retained in a generally horizontal plane similar to that shown in FIG. 6.

When ready for transcribing operations, the operator withdraws headset 1 from compartment and may hold the headset as shown in FIGS. 1 and 3, preparing to rotate and extend sound tubes 3 and 4 for use.

Figure 12A:
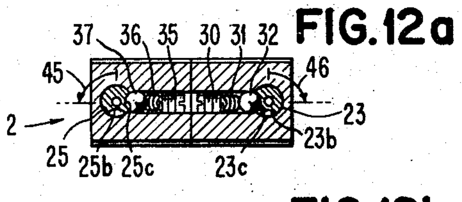
FIGS. 12*a* and 12*b* represents sectional views of the detenting mechanisms in the hub portion taken on the line 12—12 in FIG. 8 and respectively representing the detenting action for a collapsed condition as shown in FIG. 1, and the detenting action for an expanded condition as shown in FIGS. 4 and 5.
Figure 12B:
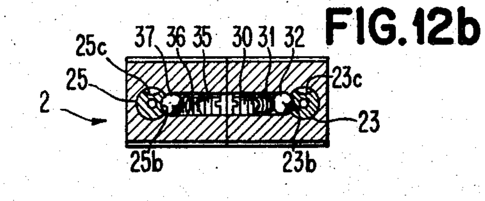

FIG. 12*a* illustrates the detenting status of the headset when in a collapsed state as shown in FIGS. 1, 3, and 6. Both FIGS. 12*a* and 12*b* represent a top cross-sectional view on the line 12—12 in FIG. 8. Since this is the case, a reorientation of the detent depressions **23*b* and 23*c*, as an example, in fitting 23 is necessary to understand the detenting action. In the collapsed state, depression 23*c* of fitting 23 is engaged with ball element 32 and depression 25*c* of fitting 25 is engaged with ball element 37. At this time, sound tubes 3 and 4 extend from hub 2**, each in its own vertical plane, but the planes are substantially parallel to one another as best seen in FIGS.

3 and 6. Sound tubes 3 and 4 are retained in this position by the detenting action.

When ready to use the headset, the operator grasps tubes 3 and 4 and rotates them approximately 90° and in a direction indicated by arrows 45 and 46, shown both in FIGS. 1 and 12*a*. The rotation at this time occurs about the center axis of the respective fittings 23 and 25 and essentially about the axes of the tubes. Tubes 3 and 4 with associated fittings 23 and 25 are rotated a sufficient distance to insure that each takes up a new detented position as determined by the detent depressions 23*b* and 25*b*, FIG. 12*b*. The status of the headset assembly upon completion of rotation about the axes of the respective fittings is illustrated in FIG. 4. At this time, ear pieces 5 and 6 are generally facing one another as shown both in FIGS. 4 and 5.

Following the rotation of the sound tubes 3 and 4 just described, the operator thereupon rotate tubes 3 and 4 and associated housings 20 and 16 about the hub portion 12*a* of pivot hub 12 and in opposite directions as indicated by arrows 50 and 51, FIG. 5. Tubes 3 and 4 with ear pieces 5 and 6 are thereby moved sufficiently far apart for insertion in the ears of the operator and then moved slightly toward one another for a comfortable fit.

Upon completion of a transcribing operation and when ready to store headset 1 in compartment 40, the operator reverses the previous sequence of operations by moving tubes 3 and 4 together until rectangular portions 16*a* and 20*a* of housings 16 and 20 abut one another and in directions indicated by arrows 53 and 54, FIG. 4. Tubes 3 and 4 and associated fittings 23 and 25 are now rotated in the opposite direction from the condition illustrated in 12*b* to that shown in FIG. 12*a*, that is, from the expanded detented condition to the collapsed detented condition. When this is done, headset 1 is ready for reinsertion in compartment 40.

To facilitate removal of headset 1 and reinsertion in compartment 40, audio wires 10 are preferably accommodated by a cord reel assembly such as that described in the Wing publication of May 1967, previously referred to.

Transcribing unit 41 has a button 55 that is depressed as cable 10 and headset 1 are moved toward and into compartment 40 and which serves to release the cord winder mechanism described in the Wing publication for pulling cable 10 into the transcribing unit.

AUDIO QUALITY CONTROL

The dimensions and relationships of the various components in headset 1 are selected to insure high sound quality and to avoid the so-called "tube" sound characteristic of prior headsets. Tubes 3 and 4 are chosen with a relatively smaller diameter. A receiver 9 is attached to the hub portion at the C-clip end, the cavity in the receiver being selected with an appropriate size to act both as an acoustic load for the receiver and as an impedance transformer between the receiver neck and the ear tubes. Sound passes from the receiver into the hub assembly 2 through aperture 12*c* of hub 12 and sound passages molded in housings 16 and 20, such as passage 16*b* associated with fitting 23 and tube 4.

CONCLUSION

From the foregoing description, it is evident that a unique headset construction is provided that insures high sound quality and that offers a number of advantages including positioning of the various headset elements into a compact arrangement to facilitate storage as well as positioning the elements to an expanded condition for use by the transcriber.

While the invention has been particularly shown and described with reference to a preferred embodiment, it will be understood by those skilled in the art that various changes in format and detail may be made without departing from the spirit and scope of the invention.

What is claimed is:

1. A headset, comprising:
a hub portion;
a pair of sound tubes extending from said hub portion, each of said tubes comprising at least one detent engaging means at a selected peripheral position about the tube axis;
means mounting said tubes in said hub portion for rotary movement of each tube essentially about its axis; and
detent means mounted in said hub portion for detenting cooperation with said detent engaging means to retain each of said tubes in its respective peripheral position with respect to said hub portion.

2. The headset of claim 1, wherein:
said tube mounting means comprises a fitting for each of said sound tubes extending into said hub portion and having detent depressions at selected peripheral positions; and wherein
said detent means is mounted in said hub portion for cooperation with each of said fittings to retain each of said tubes in detented positions, on a selective basis.

3. The apparatus of claim 2, wherein:
said detent means comprises at least a ball element, a compression spring, and an adjusting means for establishing a desired degree of detent pressure on said fittings.

4. The apparatus of claim 2, wherein:
each of said fittings has a grooved portion; and further comprising
means in said hub portion cooperating with said grooved portion for retaining said fittings and associated tubes in said hub portion during all movements thereof.

5. The apparatus of claim 2, wherein:
said hub portion comprises complementary mated pivot housings, each of said housings accommodating an associated individual one of said tubes; and
means mounting said pivot housings on a common axis for rotary movement closer together and further apart, thereby enabling positioning of the associated tubes closer together or further apart, according to the desires of the user.

6. The apparatus of claim 5, wherein:
said hub portion further comprises sound passages and baffle means arranged for optimum sound transmission irrespective of the relative positions of said tubes with respect to said hub portion.

7. The headset of claim 6, further comprising:
means in said hub portion for mounting a receiver with associated wires for transmission of sound through said hub portion to said tubes.

References Cited

UNITED STATES PATENTS

| | | | |
|---|---|---|---|
| 2,498,960 | 2/1950 | Mullin | 179—156 |
| 3,280,273 | 10/1966 | Flygstad et al. | 179—156 |

FOREIGN PATENTS

| | | |
|---|---|---|
| 294,520 | 1/1964 | Switzerland. |

WILLIAM C. COOPER, Primary Examiner

U.S. Cl. X.R.

179—178